Sept. 30, 1969   A. H. PARMENTIER   3,469,703
METHOD AND APPARATUS FOR REGENERATING THE FILTER
CLOTH OF A ROTARY FILTER TABLE
Filed April 26, 1966   3 Sheets-Sheet 1

Sept. 30, 1969          A. H. PARMENTIER         3,469,703
METHOD AND APPARATUS FOR REGENERATING THE FILTER
CLOTH OF A ROTARY FILTER TABLE
Filed April 26, 1966                        3 Sheets-Sheet 2
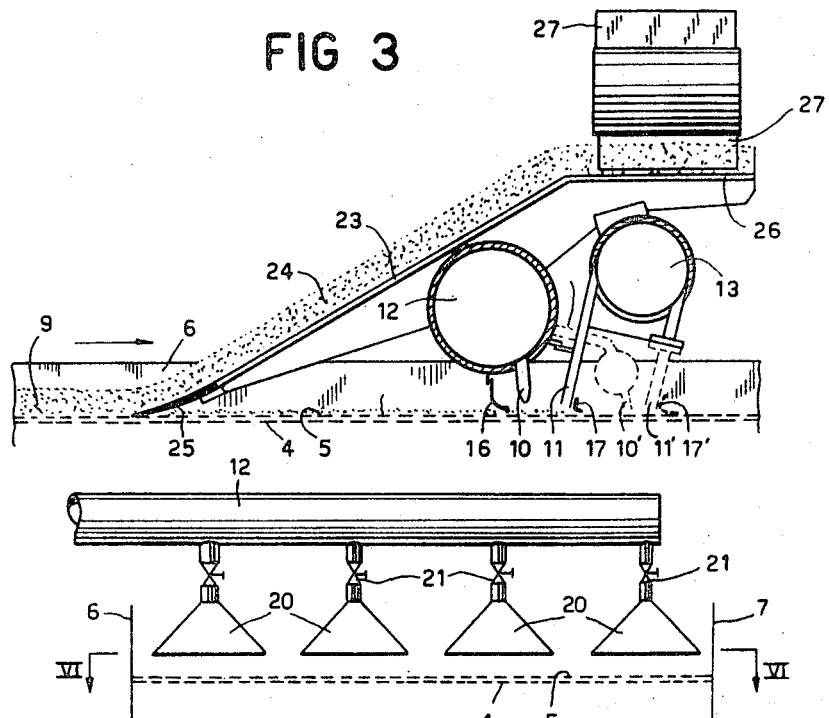
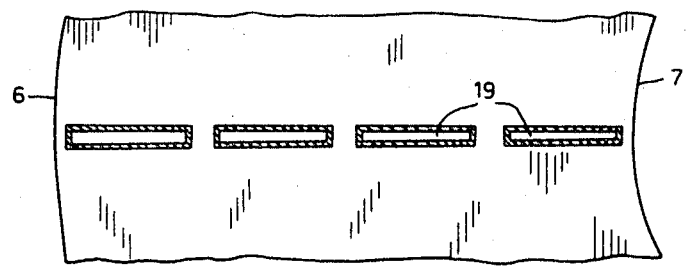

United States Patent Office 3,469,703
Patented Sept. 30, 1969

3,469,703
METHOD AND APPARATUS FOR REGENERATING THE FILTER CLOTH OF A ROTARY FILTER TABLE
Alfred Henri Parmentier, 3 La Bruyere, Lillois, Belgium
Filed Apr. 26, 1966, Ser. No. 545,328
Claims priority, application Luxembourg, Apr. 28, 1965, 48,489; Aug. 3, 1965, 49,232; Mar. 21, 1966, 50,704
Int. Cl. B01d 35/16
U.S. Cl. 210—393                                                4 Claims

ABSTRACT OF THE DISCLOSURE

Apparatus for regenerating the filter cloth of a rotray filter wherein the filter cloth bounds a closed chamber in which a repulping liquid is introduced to form a pulp with solids remaining on the cloth, and the reformed pulp is removed from the chamber by suction in concurrence with the formation of the pulp.

---

My invention relates to apparatus for regenerating the filter cloth of a rotary filter table. Conventional filter tables are formed by a ring mounted on a circular rollway regularly and continuously rotated around a vertical shaft by a suitable drive. The ring is conventionally subdivided into 12–32 identical sectors each formed by a compartment covered with a perforated sheet of metal to which the filter cloth is attached. The bottom of the compartment is formed with the necessary apertures for connecting the compartment to a vacuum distributor. The vacuum distributor applies negative pressure during a certain portion of the circular compartment travel and evacuates the liquid entering the compartment through the filter cloth. A negative pressure operating downwardly therefore performs in each compartment the following successive operations: filtration, i.e. the separation of the solid material from the liquid which together therewith forms the suspension or pulp to be treated; methodical washing of material deposited on the filter cloth by one or more liquids; and, if necessary drying of the material by air sucked through the deposit on the filter cloth.

The following operation relates to the removal of the material deposited on the filter cloth. In order to retain the suspension or pulp poured onto the filter cloth, the ring forming the filter table must have confining edges at its external and internal peripheries. The presence of the edges impose the requirement that the material deposited on the filter cloth has to be raised before it can be evacuated from the table by lateral displacement. Whatever the mechanism conventionally used to this end may be, a horizontal knife followed by an inclined plane, an Achimedean screw, a drum with blades discharging on a radial conveyor, or some other device, it cannot directly contact the filter cloth without wearing the same out rapidly. Consequently, there remains on the cloth a layer several millimetres in thickness which must be removed before the start of the following cycle of operations, unless the material is to be allowed to rotate with the table, the result being that the filter cloth becomes clogged and has a reduced output.

It is difficult to remove the layer of material remaining on the filter cloth and properly wash it, more particularly because of the fixed edge of the filter table. To obviate this disadvantage means have been used which actually considerably complicate arrangements on a rotary filter table and occupy a wide sector thereof.

For instance, the filter cloth has been unclogged and cleaned by means of jets of liquid in a sector in which the edge is removed from the table circumference, an endless belt of resilient material being used to this end which is applied like an edge to the table circumference, except for the declogging sector, where it is deflected several times by rollers. The belt is resiliently tensioned and subject to rapid wear; it cannot readily be guided adequately and requires continuous supervision.

According to another suggestion, the compartments forming the rotray filter table are independent of one another and at a particular plate on the table are inverted around a radial axis to cause the solid material accumulating on the filter cloth to drop into a hopper, so that the cloth can be washed and if necessary dried before the compartment is returned to its normal working position for filtering. Such movements of the compartments require a complicated mechanical system extending over a wide sector of the rotary table. Moreover, the deposit on the filter cloth must be properly dried for it to be detached therefrom when reversal occurs, and this is a useless step when the deposit in a waste material without industrial value which very often is repulped in order to be evacuated to a place where it is deposited. Examples are gypsum from the manufacture of phosphoric acid, limestone from carbonated juices in sugar factories or limestone from the manufacture of ammonium sulphate from gypsum.

In comparison with the prior art, the apparatus for regenerating the filter cloth according to the invention has the advantage of being very simple, of occupying only a very small sector of the rotary table and of being readily adaptable to all filtering requirements, whether the deposit on the filter cloth is a desirable product or is merely waste material without industrial value.

In the apparatus according to the invention, liquid is sprayed on to the material on the filter cloth in a separate sector to separate the material from the filter cloth by repulping the material, whereafter the resulting pulp is evacuated by upward suction.

The apparatus according to the invention comprises, above the repulping sector, at least one liquid-spraying ramp and a cooperating suction ramp which are disposed transversely of the table.

The apertures in the ramps can take the form of a narrow slot extending over the whole width of the filter cloth, or be formed by a number of aligned slots; advantageously the width of the slots is greater towards the external periphery than towards the internal periphery of the table.

When the apparatus comprises a number of pairs of cooperating ramps, some mounted on a common pressurized liquid conduit and the others on a common collector at negative pressure, the ramps are so disposed above the filter cloth that each pair of cooperating ramps is independent of the other pairs of cooperating ramps and is separate therefrom.

When the solid material deposited on the filter cloth is a waste which is to be taken in pulp form to the place where it is deposited, repulping is preferably performed entirely on the filter cloth. If the liquid for washing the material deposited on the filter cloth has the same composition as the repulping liquid it is pointless, and even disadvantageous to dry the material.

However, if the solid material deposited on the filter cloth is a desired product, for instance a coloring material, the apparatus according to the invention is advantageously combined with an unloading mechanism which raises the material above the level of the table edges to evacuate it sideways, and leaves on the filter cloth a thin layer of material to be repulped as described hereinbefore by the apparatus according to the invention disposed downstream of the unloading mechanism. In many cases the resulting pulp can act as the washing liquid and the solid material from the pulp is in that case deposited on the material disposed on the filter cloth at the sectors of the final washing, so that the solid material can be completely recovered in a much simpler manner than is possible with the prior art rotary filter tables.

If the repulping liquid has a different composition from the liquid for washing the material deposited on the filter cloth, or concentrated liquors from the filtering sectors are not to be diluted by the liquid retained by the filter cloth, it is advantageous to combine the apparatus according to the invention with members for drying the filter cloth disposed downstream of the repulping device.

It has also been found that regeneration of the filter cloths of a rotary filter table by means of an apparatus according to the invention is improved if air is passed upwardly through the filter cloth subjected to the action of the cooperating ramps. Of course, air can be successively blown through an aperture with which the vacuum distributor is formed to this end, into each of the sectors of the table. The air therefore passes through the whole surface of the filter cloth in each sector during blowing, or even through the filter cloth of a number of sectors. The result of the prior art would therefore be reduced efficiency and a loss of filtering surface, since the whole compartment is affected.

Since the apparatus according to the invention covers only a small portion of such surface, according to the invention the maximum blowing of air is exclusively limited to that portion of the filter cloth which is disposed beneath the device for regenerating the filter cloth. To this end, the gap between the ramps is closed by a transparent cover having sealing joints and an air suction pipe branching off the pipe sucking the pulp or connected to a separate machine. The apparatus thus sucks air upwardly only through that portion of the filter cloth which is subjected to the action of the cooperating ramps, since the chamber forming the improved apparatus is closed. The closed device also applies to a drum which rotates in vacuo around a horizontal shaft and is based on similar principles applicable to the horizontal table.

A number of exemplary embodiments of the invention are illustrated diagrammatically in the accompanying drawings, wherein:

FIG. 3 is a section, similar to that in FIG. 2, through an apparatus according to the invention combined with a system for evacuating the solid material deposited on the filter cloth.

FIG. 5 is an elevation of a liquid-spraying ramp formed with a number of aligned slots.

FIG. 6 is a section, taken along the line VI—VI in FIG. 5.

Figure 1:
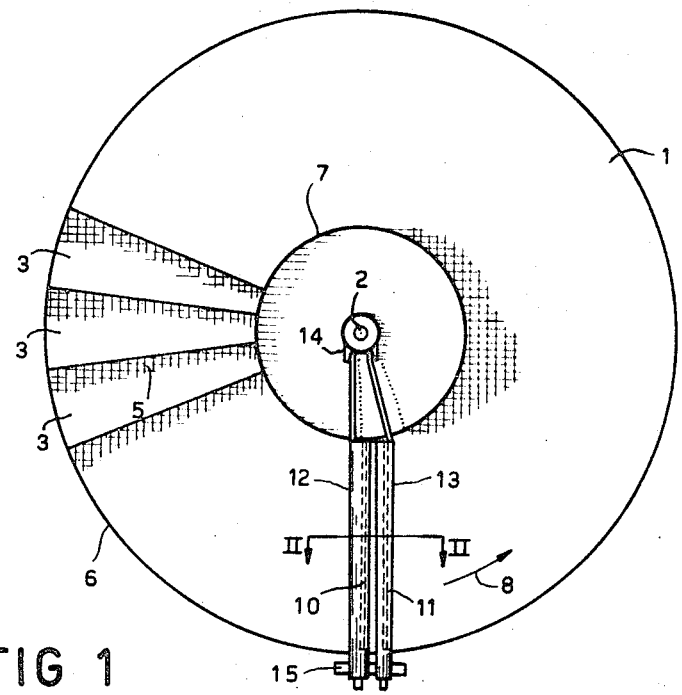
FIG. 1 is a plan view of a rotary filter table fitted with an apparatus according to the invention.

A conventional rotary filter table comprises a ring 1 regularly and continuously rotated around a vertical shaft 2. The ring 1 is formed by compartments 3 which are rigidly connected to one another and whose top surface is a perforated sheet 4 of metal on which a filter cloth 5 is located. The bottoms of the compartments 3 are formed with apertures (not shown) enabling the compartments to be connected to a vacuum distributor bearing the pipes which evacuate the liquid passing through the filter cloth.

The external periphery of the ring 1 is formed with an edge 6, and its internal periphery is formed with an edge 7. The edges 6, 7 bound a wide flat circular channel which has as its base the filter cloth 5 and receives in the region marked by an arrow 8 the suspension or pulp for treatment. The material is spread out between the edges 6, 7, and solids are first separated from the liquid by the vacuum applied to the compartments 3. The liquid is collected in the compartments and passes therefrom into the vacuum distributor, while the solid remains deposited in a layer (FIGS. 2 and 3) on the filter cloth and are repeatedly and methodically washed under vacuum by a liquid which passes successively from the final to the first washing stage. If necessary the layer 9 is also dried by downwardly sucked air.

According to the invention, the deposit of solids on the filter table is removed and the filter cloth is regenerated by the repulping of the material on the filter cloth, and the suction of the pulp at the repulping place.

The apparatus used to this end comprises above the repulping sector at least one liquid-spraying ramp 10 cooperating with a ramp 11 which sucks the resulting pulp. The ramps 10, 11 are disposed transversely of the table, the ramp 10 being mounted on a conduit 12 for pressurized liquid, and the ramp 11 on a collector 13 at negative pressure. The conduit 12 and the collector 13 are located in the center of the table on a support 14 and at its external periphery on the support 15 (FIG. 1).

The repulping sector is separated upstream from the other sectors by a resilient strip 16 which is applied against the deposit of solids and attached to the conduit 12, and downstream by a resilient strip 17 which bears against the filter cloth 5 and is located on the suction ramp 11. The strips 16, 17 bound a sector which has a very small opening angle of about 15–25°.

Figure 2:
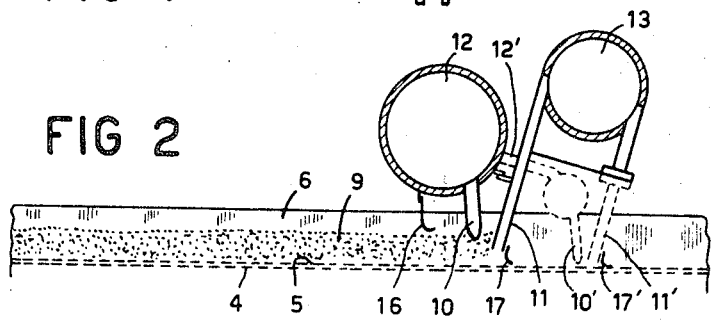
FIG. 2 is a section, to an enlarged scale, along the line II—II in FIG. 1, through an apparatus according to the invention.

Advantageously, the apparatus has a number of pairs of cooperating ramps 10, 11, as shown by chain lines 10', 11' in FIGS. 2 and 3. The ramps 10', 11' are separated by a strip 17 from the ramps 10, 11 and by a strip 17' from the downstream area, where other pairs of ramps can be provided. The first pair of ramps repulps the solid and evacuates the resulting pulp, while each subsequent pair of ramps unclogs and more completely cleans the filter cloth. The number of pairs of ramps mounted on the table depends on its dimensions and obviously on the varying extent to which the deposit of solids sticks or clogs. The ramp 10' is mounted on a conduit 12' fed by the conduit 12, while the ramp 11' is advantageously mounted directly on a collector 13.

Figure 4:
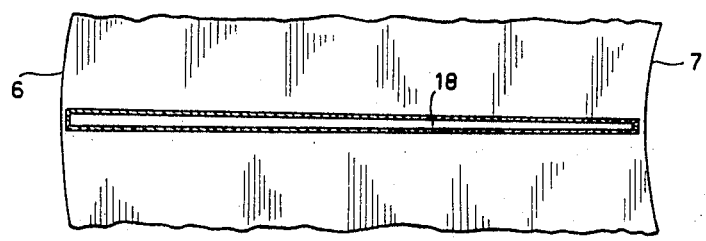
FIG. 4 is a view of a slot in the liquid-spraying ramp.

The ramp 10, and preferably the suction ramp 11 also, is formed with an aperture in the shape of a narrow slot which may be one slot 18 (FIG. 4) or a succession of slots 19 (FIG. 6) extending from the edge 6 to the edge 7 of the table. The series of slots is preferably produced by means of funnels 20 (FIG. 5) mounted by the agency of control members 21 on the conduit 12. Since more material has to be repulped near the edge 6 than near the edge 7, the slots widen from the internal edge to the external edge.

If the material deposited on the filter cloth is waste without industrial value, the whole preferably undried layer 9 is sent to the repulping device, and the pulp sucked by the ramp 11 can be evacuated directly to the place where it is to be deposited. If on the other hand, the solids forming the layer 9 are the required product, the repulping device is combined with a known mechanism for unloading the table which is disposed upstream of the apparatus according to the invention, and only a thin layer 22 remaining on the filter cloth reaches the repulping device. FIG. 3 shows by way of an example an unloading device which comprises an inclined plane 23 over which the top portion 24 of the layer 9, which is detached by a horizontal knife 25 a few millimetres from the filter cloth 5, rises towards a horizontal plate 26 over which scrapers 27 of a transverse scraping conveyor move. In this case it is advantageous to thoroughly dry the layer 9 before it reaches the knife 25. The small amount of pulp collected in the collector 13 can be used as the liquid in the final stage of washing of the layer 9, or it can be added to such liquid, enabling the solids in the pulp to be recovered in a very simple manner.

The apparatus according to the invention can also be combined with a device for drying the filter cloth, if a fresh filtering cycle has to be started with a regenerated dry cloth.

Figure 7:
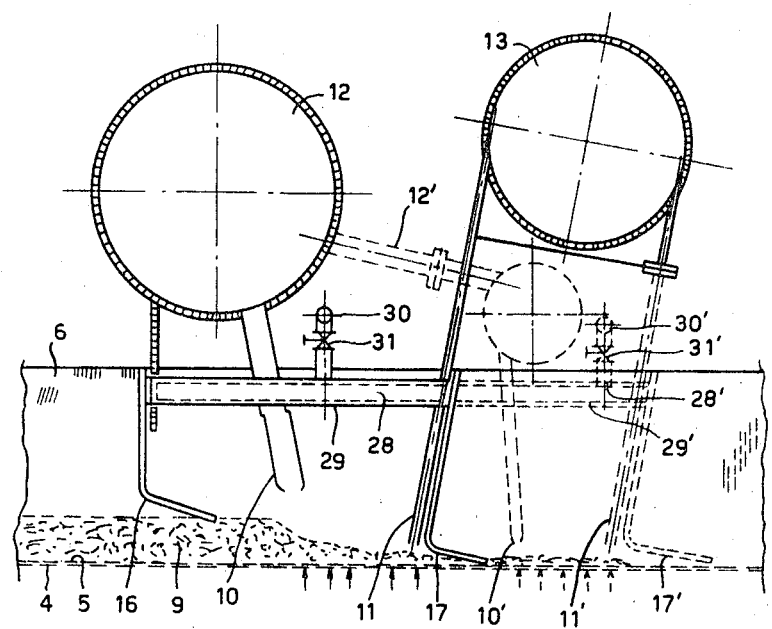
FIG. 7 is a section, taken along the line II—II in FIG. 1, showing the suction device limited to that portion of the filter cloth which is below the ramps.

FIG. 7 shows a preferred embodiment of the invention in which the space between the cooperating ramps is closed to enable the air to be sucked in only at that portion of the filter cloth which is disposed under the ramps. As has been described hereinbefore with relation to FIG. 2, the resilient strip 16 attached to the injection ramp 10 bears by its lower portion against the surface of the deposit of solids 9 and the ends of the resilient strip 16 bear against the external and internal edges 6, 7 of the table. The resilient strip 17 attached to the suction ramp 11 bears by its lower portion against the filter cloth 5 and by its ends against the edges 6, 7 of the table. The solids 9, the filter cloth 5, the table edges 6, 7 and the resilient strips 16, 17 therefore form an upwardly open chamber. Since the chamber is open, the suction machine (vacuum pump, suction fan, self-starting pump or the like) which establishes the negative pressure in the ramp 11 cannot suck the air through the filter cloth. However, such suction would be possible if the chamber were to be completely closed. The chamber is closed according to the invention in the manner described hereinafter.

(a) The resilient strips 16, 17 widen upwardly to reach approximately the top level of the table edges 6, 7.

(b) Disposed between the cooperating ramps 10, 11 is a sealing-tight cover 28 disposed at a level slightly lower than the top level of the table edges 6, 7. The cover is made of a transparent material to enable events occurring in the box to be observed.

Each of the smaller sides of the cover bears at its end a joint 29 made of rubber or some other resilient mate- which contacts the edges 6–7 during the rotation of the table and bears by its lateral ends against the resilient strips 16–17. Since the box is thus completely closed, the machine sucks via the ramp 11 the pulp formed by the water injected by the ramp 10 and therefore sets up a negative pressure in the chamber. The sucked air consequently passes upwardly through that portion of the filter cloth which forms the bottom of the closed chamber.

A less powerful machine can be used merely for the suction of the suspension via the ramp 11, by setting up a negative pressure in the closed chamber by the agency of a separate suction fan connected to a pipe 30 having a regulating member 31 and attached to the cover 28.

All the filtered solids 9 or the residual solids 22 are therefore inside a closed system formed by the edges 6–7, the resilient strips 16–17, the sealing-tight cover 28 and the joint 29, inside which the ramps 10–11 act and into which, if necessary, the suction pipe 30 with its control member 31 extends.

The ramp 10 sprays the washing liquid at pressure against the solid deposit 9 or 22. The resulting pulp is immediately sucked by the cooperating ramp 11. The cooperating ramp 11, or the separate suction fan, at the same time sets up in the chamber a negative pressure in the order of 100 millimetres of water column. The air is sucked upwardly through the filter cloth 5. The air keeps the solid in suspension by bubbling and frees the cloth from solid particles caught in its stitches during filtering.

If a number of pairs of cooperating ramps are used, the improvements described hereinbefore apply to each pair, as shown by references 28′, 29′, 30′, 31′ in FIG. 7 showing the members of a second apparatus.

Figure 8:
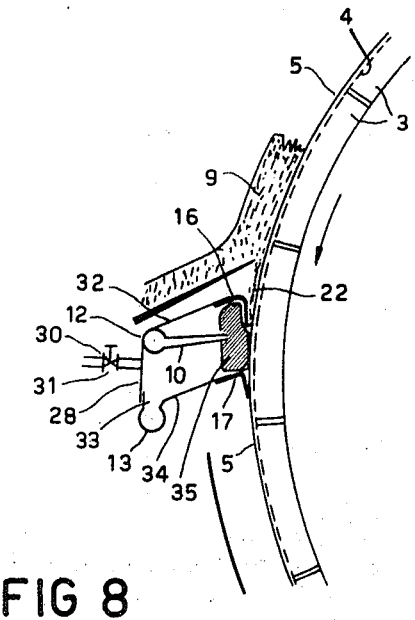
FIG. 8 is a cross-section through the end of a rotary filter drum in which the apparatus according to the invention is used.

FIG. 8 is a cross-section through the end of a rotary filter drum in which the apparatus according to the invention is used. Just as in the table heretofore described, the filter drum is divided into separate compartments 3 whose bottoms are formed with apertures connected via pipes to a vacuum distributor mounted on a shaft. The upper portion of the compartments which forms the drum periphery is formed by perforated sheets 4 of metal covered with a filter cloth 5. In the pulping trough in which the drum rotates, the cloth of the compartments is subjected to negative pressure and becomes covered with a layer of solids 9 and is washed and dried as rotation progresses. The solids are then generally removed by a conventional scraping knife which leaves a residual layer 22 on the cloth. A fresh filtering cycle then produces a poor yield as a result of the cloth becoming clogged. The closed apparatus according to the invention can be disposed between the scraping knife and the trough.

The apparatus comprises cooperating ramps 10–11 mounted on one or more supports allowing the position of the ramps to be adjusted. The ramp 10 sprays pressurized liquid supplied via a conduit 12 against the solid material sticking to the cloth. The conduit 12 retains by the agency of a support 32, forming a longitudinal side of a chamber, a resilient strip 16 which bears resiliently against the solid material and provides the required sealing. The ramp 11 evacuates the resulting pulp, whose flow is encouraged by the shape of the drum.

The ramp 11 is formed as follows, for instance: there is welded to the collector 13 a ramp element 33 orientated to be assembled with the cover, and also another member 34 which forms the second long side of the box and via which the pulp flows towards the collector and which bears the second resilient strip 17 providing a seal.

Disposed between the conduit 12 and the collector 13 is a sealing transparent cover 28 bearing pipe 30 with its adjusting member 31 for air suction by means of a suction device. Unlike the table, the filter drum has no edges enabling the chamber to be closed by sealed joints.

However, the chamber can be closed simply by two small walls welded at the end of the supports 32–34 of the resilient strips. Each wall ends in a highly resilient joint 35, made of foam rubber for instance, which bears on the one hand against the solid material and the filter cloth and on the other hand against the resilient strips 16–17 to which it is connected. The chamber is therefore closed, the only air-permeable wall being formed by the filter cloth. The pressurized liquid sprayed by the ramp 10 forms with the residual solid material 22 a pulp which flows over the member 34 of the ramp 11 and is sucked by the collector 13. The suction device connected to the pipe 30 establishes a negative pressure in the box and the air is sucked through the filter cloth only in that portion thereof which is subjected to the action of the ramps.

Clearly, although this will less frequently be required, the scraping knife can be eliminated, all the solid material in the layer 9 being repulped and evacuated. The rapid flow of the pulp over the inclined plane 34 increases the efficiency of the washing, but a second pair of independent cooperating ramps can be provided to regenerate the filter cloths.

The resulting pulp can be used for washing lumps of solid material, as explained hereinbefore in relation to the horizontal table.

Of course, the invention is not limited to the exemplary embodiments thereof described and illustrated, and modifications can be made without exceeding the scope of the invention.

What I claim is:

1. Apparatus for regenerating the filter cloth of a rotary filter, said apparatus comprising means defining an enclosed chamber which is in part bounded by the filter cloth, means in said chamber for discharging a repulping liquid on solids remaining on the filter cloth, and means in said chamber for operating simultaneously with the repulping liquid discharge means to withdraw by suction the reformed pulp on the filter cloth, the latter means serving to produce a suction pressure within the chamber which causes air to be sucked through the portion of the filter cloth bounding the chamber while preventing outflow of liquid from the chamber and through the cloth, said repulping liquid discharge means and said suction means comprising first and second respective conduits, sad means which define the chamber comprising resilient elements coupled to the conduits and in sealing contact with the filter cloth, and a cover means cooperating with the conduits and resilient elements to enclose said chamber.

2. Apparatus as claimed in claim 1 wherein said conduits include ducts arranged in pairs, each pair including one duct coupled to the liquid discharge conduit and one duct coupled to the suction means, and means coupled to at least one of the conduits for isolating each pair of ducts in said chamber.

3. Apparatus as claimed in claim 1, wherein said rotary filter is a table comprising a ring formed with a plurality of compartments, the top surface of the compartments being a perforated sheet on which the filter cloth is located, the bottoms of the compartments being formed with apertures for connection of the compartments to a vacuum distributor which evacuates the liquid passing through the filter cloth.

4. Apparatus as claimed in claim 1, wherein said rotary filter is a drum, said resilient elements including members extending longitudinally and transversely of the drum, the cover means being a transparent cover so disposed in relation to the longitudinal and transverse members to hermetically seal said chamber.

References Cited

UNITED STATES PATENTS

| | | | |
|---|---|---|---|
| 693,896 | 2/1902 | Parker | 210—391 |
| 2,395,098 | 2/1946 | Butler | 210—291 |
| 2,409,524 | 10/1946 | Ahlfors | 210—81 X |
| 2,802,572 | 8/1957 | Jalkanen | 210—82 |
| 2,919,027 | 12/1959 | Blumenfeld | 210—169 |
| 3,245,420 | 4/1966 | Cherney | 210—169 |

SAMIH N. ZAHARNA, Primary Examiner

J. ADEE, Assistant Examiner

U.S. Cl. X.R.

210—404